United States Patent
Wong et al.

(10) Patent No.: US 6,603,499 B2
(45) Date of Patent: Aug. 5, 2003

(54) PRINTHEAD HAVING NON-UNIFORMITY CORRECTION BASED ON SPATIAL ENERGY PROFILE DATA, A METHOD FOR NON-UNIFORMITY CORRECTION OF A PRINTHEAD, AND AN APPARATUS FOR MEASURING SPATIAL ENERGY PROFILE DATA IN A PRINTHEAD

(75) Inventors: Victor C. Wong, Rochester, NY (US); Badhri Narayan, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/891,755

(22) Filed: Jun. 26, 2001

(65) Prior Publication Data

US 2003/0007062 A1 Jan. 9, 2003

(51) Int. Cl.[7] .................................................. B41J 2/435
(52) U.S. Cl. ..................................................... 347/236
(58) Field of Search .......................... 347/236, 19, 246, 347/237, 247, 253

(56) References Cited

U.S. PATENT DOCUMENTS

| | | | |
|---|---|---|---|
| 4,751,377 A | 6/1988 | Ishizaka et al. | 250/205 |
| 4,827,279 A | 5/1989 | Lubinsky et al. | 347/188 |
| 5,016,027 A | 5/1991 | Uebbing | 347/236 |
| 5,546,165 A | 8/1996 | Rushing et al. | 399/78 |
| 5,640,190 A | 6/1997 | Bollansee et al. | 347/240 |
| 5,661,544 A | 8/1997 | Ishikawa et al. | 355/41 |
| 5,684,568 A | 11/1997 | Ishikawa et al. | 355/68 |
| 5,790,240 A | 8/1998 | Ishikawa et al. | 355/68 |
| 5,946,006 A | 8/1999 | Tajika et al. | 347/19 |
| 5,956,052 A | 9/1999 | Udagawa et al. | 347/19 |
| 6,034,710 A | 3/2000 | Kawabe et al. | 347/236 |

Primary Examiner—Michael Nghiem
(74) Attorney, Agent, or Firm—Nelson Adrian Blish

(57) ABSTRACT

A printhead having a plurality of exposure elements (18) with improved non-uniformity correction. Spatial variance of the energy emitted by the exposure elements (18) is measured and used to establish spot size characteristics for each exposure element. A sensor (26) scans multiple points along the pixel area written by each exposure element (18) and measures a corresponding output power value at each point. The output power values are evaluated to determine a maximum output power value for the exposure element (18) and to obtain a spot size for the exposure element (18) based on full-width at half-power values. Both spot size data, which can thus be obtained and stored only once, and output power values are then used to correct for non-uniformity's between the exposure elements (18).

18 Claims, 4 Drawing Sheets

PRINTHEAD HAVING NON-UNIFORMITY CORRECTION BASED ON SPATIAL ENERGY PROFILE DATA, A METHOD FOR NON-UNIFORMITY CORRECTION OF A PRINTHEAD, AND AN APPARATUS FOR MEASURING SPATIAL ENERGY PROFILE DATA IN A PRINTHEAD

FIELD OF THE INVENTION

This invention generally relates to correction of non-uniformities in a printhead that directs exposure energy onto a medium and more particularly relates to a printhead having multiple exposure elements corrected for non-uniformities, a method for correcting non-uniformity of such exposure elements, and an apparatus for non-uniformity correction of a print head.

BACKGROUND OF THE INVENTION

Recent advances in printer technologies and related technologies, such as digital photography, have led to increased use of high quality printers. The problem of non-uniform density output from a printer is a well-known problem in the printer art. Non-uniformity is particularly problematic in high-quality color printers, such as in the photofinishing arts, where it is important to be able to faithfully reproduce subtle changes in shading and gradation or flat fields having the same density. Non-uniform response of a printhead can cause unacceptable anomalies such as streaking and banding, which can easily render a print unacceptable, or at least disappointing, for its intended audience.

Factors that contribute to printer non-uniformity vary, depending on the specific print technology. With a thermal printhead, for example, where resistive print elements are aligned along a writing surface, slight mechanical irregularities or tolerance build-up can cause some elements to be more effective in transferring heat, than others. With a printhead that scans optically, such as a CRT printhead, optical aberrations or fringe effects can mean that light power is less effectively distributed at the extreme edges of the scan pattern than it is in the center of a scan line. In a photofinishing system that uses an array of light-emitting exposure elements, such as a Micro Light Valve Array (MLVA) using lead lanthanum zirconate titanate (PLZT) light valves (sold for example as the model QSS-2711 Digital Lab System manufactured by Noritsu Koki Co., located in Wakayama, Japan), individual elements in the array may emit varying intensities of light. The continued development of digital solutions for image scanning and exposure make the problem of achieving print uniformity particularly important.

Conventional solutions for correcting non-uniformity of printheads having multiple print elements are directed to obtaining an output power measurement for each print element of the array and adjusting a variable drive energy (typically voltage, current, or pulse width) for each array print element in order to compensate for differences in the output power measurement.

U.S. Pat. No. 5,661,544 (Ishikawa et al.) discloses measuring print density of a target medium using a scanning device, such as a flatbed scanner. Exposure correction data are then converted to electronic control signals for the individual print exposure elements. Notably, the method disclosed in this patent does not directly measure exposure energy of print elements but measures the effects of exposure energy when applied to a photosensitive medium. Accordingly, this method requires compensation for variability of print media sensitivity, print development chemistry, and scanner response characteristics.

U.S. Pat. No. 5,684,568 (also to Ishikawa et al.) discloses direct measurement of output power of exposure elements of a PLZT printer. A sensor is scanned across the PLZT array, to measure the light output of each individual array component. Compensation factors can then be computed for individual components in the PLZT array.

U.S. Pat. No. 5,016,027 (Uebbing) discloses a light detector consisting of an array of photodiodes that allows continual measurement of exposure power from LED sources of an LED printhead. The light detector is disposed along an edge of the beam path, but before any focusing element used for exposure of the photosensitive medium. The light detector measures the relative output power of each LED exposure element and actual exposure power is derived by applying compensation for measured losses in the focusing optics.

U.S. Pat. No. 5,640,190 (Bollansee et al.) discloses measuring output power for a group of LED exposure elements and for individual exposure elements. In addition, measurements of output density are obtained. A compensation factor is computed based on the measurements to correct for non-uniformity of the exposure elements.

It is also known to store correction information in a memory that is coupled to a printhead itself. As an example, U.S. Pat. No. 4,827,279 (Lubinsky et al.) discloses storing a correction table for adjusting pulse count in a memory coupled to a thermal printhead. Similarly, U.S. Pat. No. 5,684,568 (Ishikawa et al.) discloses storing a uniformity correction table in a read/write memory coupled to a PLZT printhead.

SUMMARY OF THE INVENTION

It is an object of the present invention to provide an improvement to a printer for non-uniformity correction and a method and apparatus for non-uniformity correction in a printhead having a plurality of exposure elements.

A first aspect of the invention is a printhead assembly for imaging onto a medium, the printhead assembly comprising a printhead having a plurality of exposure elements capable of emitting exposure energy into an area, a memory coupled to the printhead and containing a compensation value for each of at least some of the exposure elements. The compensation values are determined by obtaining a plurality of positional output power measurements corresponding to one of a set of predefined spaced-apart positions within the area to determine a spatial characteristic of exposure energy emitted by the corresponding exposure element.

A second aspect of the invention is an apparatus for obtaining a spatial profile of exposure output power from an exposure element in a printhead comprising a plurality of exposure elements. The apparatus comprises a sensor configured to obtain positional output power measurement for the exposure elements corresponding to a portion of the exposure output power of the corresponding exposure element emitted at each one of a plurality of predefined positions, a translation apparatus for configuring the sensor for measurement at each one of the plurality of predefined positions for the exposure element to thereby permit the sensor to obtain a sequence of the positional output power measurements for a corresponding one of the exposure elements, control logic programmed to accept the positional output power measurements from the sensor and to generate spatial profile information using the sequence of the positional output power measurements, and a memory operatively coupled to the control logic and storing the spatial profile information for the corresponding one of the exposure elements.

A third aspect of the invention is a method for compensating for non-uniformity of an exposure element in a printhead comprising a plurality of exposure elements which emit exposure energy into an area. The method comprises the steps of obtaining a sequence of output power measurements for an exposure element, each the output power measurements in the sequence corresponding to a predetermined position within the area, deriving a correction value based on the sequence of output power measurements, storing the correction value for the exposure element, and applying the correction value for controlling the exposure element.

A fourth aspect of the invention is a method for printing using a printhead that employs a plurality of exposure elements that emit exposure energy within an area. The method comprises the steps of obtaining a spatial profile compensation value for an exposure element from a sequence of measurements made at successive positions within the area, and deriving exposure element compensation values based the spatial profile.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description of a preferred embodiment when taken in conjunction with the accompanying drawings, wherein:

DETAILED DESCRIPTION OF THE INVENTION

Figure 1:
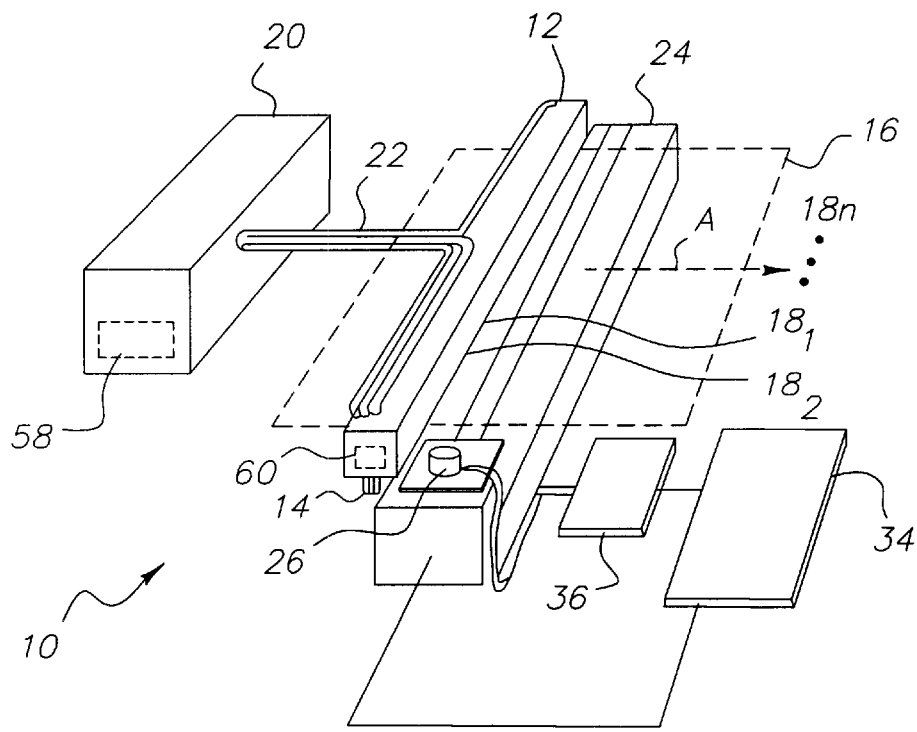
FIG. 1 is a perspective view showing an apparatus of the preferred embodiment for obtaining spatial profile measurements of individual exposure elements in a printhead array.

Factors contributing to non-uniformity in printers with linearly arrayed exposure elements, i.e. elements for applying exposure energy to media, include the following:

(a) non-uniform deterioration rate in optical efficiency of light modulating components over time;

(b) uneven distribution of light that illuminates the writing array;

(c) differences in manufacture of array exposure elements, resulting in varying light output characteristics from pixel to pixel; and (d) spot profile distortion caused by self-focusing lens arrays.

Of these factors, factor (a) is a function of component aging. Factors (b), (c), and (d), on the other hand, are due to physical manufacture tolerances and optical geometry. While conventional methods such as those noted above are able to provide some measure of non-uniformity correction for a printer having a plurality of exposure elements, such methods do not address fully the factors noted above. Conventional methods for correction of non-uniformity correctly recognize that optical power is a factor to be controlled for obtaining uniform exposure energy. However, the conventional methods fail to account for another key factor of exposure that must be considered for correction of non-uniformity.

The general definition of exposure energy can be expressed as follows:

$$\text{Exposure} = \text{Intensity} * \text{Time}$$

Light intensity is expressed in terms of power per unit area. Exposure is, therefore, directly proportional to optical power. However, exposure is also inversely proportional to spot area. In other words, an amount of energy dispersed over a broad area may have little or no effect on an energy sensitive medium. However, the same amount of energy focused on a tiny spot can have significant exposure effects. Conventional methods do not take into account the spatial characteristics of the exposure element, i.e. the spot area. Moreover, some factors that affect non-uniformity are static, that is, are fixed by printhead geometry at manufacture and do not change measurably over the useful life of a printhead. Factors (b), (c), and (d) enumerated above are generally static factors affecting uniformity that do not change over time. Conventional methods continually address static factors with measured data because measurement of static factors and dynamic factors are not distinguishable in such methods. However, static values for these factors could simply be measured once and stored. Thus, conventional methods make printhead adjustment and calibration more difficult than is necessary and frustrates efforts to obtain uniformity from a printhead.

As noted above, factors (b), (c), and (d) are generally fixed at manufacture and do not change measurably during the life of the printhead, e.g. a PLZT printhead. A correction table for factors (b), (c), and (d) for a PLZT exposure element array could therefore be stored in read-only memory (ROM) and used throughout the life of the printhead.

In the preferred embodiment described below, the subscript i indicates an individual exposure element (or corresponding values, areas, or data), with the range of subscript i from 1 to n (in a printhead array comprising n exposure elements). Exposure energy is directly proportional to optical power while it is inversely proportional to spot area. Note, the phrase "spot characteristic or spatial characteristic" as used herein refers broadly to the spatial characteristics of energy emitted form an exposure element and encompasses any characterization of spatial qualities of the energy. In a printhead having a plurality of exposure elements, where each element individually applies an exposure energy to an area, such as a pixel area on a print medium, applicant has discovered that it is useful to characterize the performance of an exposure element by taking both the output power and spatial profile of the exposure elements into account. As noted above, measurement of output power is well-known in the printer art and is generally referred to as power calibration. Effective output power can be measured directly, by disposing a sensor in the path of the exposure beam or by diverting a portion of the exposure beam during writing. Or, effective output power can be measured indirectly, such as using measurement of achieved densities on a calibration test print. Periodic measurements of effective output power can help to adjust for drift in output power over time, due to heat, aging, or other factors that cause output power to change during the useful life of a printhead.

In contrast, the spatial profile of a printhead is substantially fixed at manufacture. Printhead characteristics that impact its spatial profile include differences in optical geometry of exposure elements in the array, such as mechanical tolerances, slight differences in lens thickness or optical fiber positioning, and the like. Therefore, once a printhead having a plurality of exposure elements is manufactured, its spatial profile generally can be reused throughout the useful life of the printhead.

FIG. 1 illustrates apparatus 10 for obtaining spatial profile measurements of energy emitted by exposure elements in accordance with a preferred embodiment of the invention. Apparatus 10 can obtain spatial profile data of exposure elements in printhead 12, at manufacture for example, and is also capable of measuring output power of the same exposure elements for periodic calibration during the operating life of printhead 12. In the preferred embodiment, printhead 12 is an optical printhead having exposure elements using PLZT light-valve technology, in which printhead 12 comprises a plurality of light valves 60. In apparatus 10, self-focusing lens array 14 directs light from exposure elements onto photosensitive print medium 16, represented in dotted outline in FIG. 1. As print medium 16 is passed beneath printhead 12 in the direction indicated by arrow A, selected individual exposure elements of n total elements, $18_1$, $18_2$, ... $18_n$ (see FIG. 2) direct a modulated exposure beam onto receiver medium 16 to form pixels in a known manner. In this way, printhead 12 images a line at a time, n pixels wide, in order to create an image on print medium 16. To achieve high resolution, printhead 12 can have hundreds or even thousands of exposure elements $18_1$, $18_2$, ... $18_n$. The optical signal for each exposure element $18_1$, $18_2$, ... $18_n$ originates at optics assembly 20 and is directed to printhead 12 using bundle 22 of fiber optic cables. Hereinafter exposure elements will be referred to with a subscript when discussing a particular exposure element and without a subscript when discussing exposure elements generally.

Components of apparatus 10 for measuring the overall output power and spatial profile of elements $18_1$, $18_2$, ... $18_n$ of printhead 12 are discussed below. Translation assembly 24 provides the necessary positioning hardware to precisely position sensor 26 at successive positions along the optical path of exposure elements $18_1$, $18_2$, ... $18_n$ of printhead 12. In the preferred embodiment, translation assembly 24 can be a Motorized Translation Stage (one of a number of available MTM Series devices) manufactured by Newport Corporation, located in Irvine, Calif. Translation assembly 24 can be of various forms to provide precision movement at the resolution required to position sensor 26 at the desired location with respect to each exposure element $18_1$, $18_2$, ... $18_n$ or otherwise configure sensor 26 to sense energy at a desired location. Sensor 26 can be a photosensor, such as DET 110 High Speed Photo Detector manufactured by Thorlabs, Inc., located in N. Newton, N.J. Control logic processor 34, a programmable microprocessor based controller for example, controls translation assembly 24 in a known manner. Signals from sensor 26 are processed by A/D converter 36 coupled to control logic processor 34.

Figure 2:
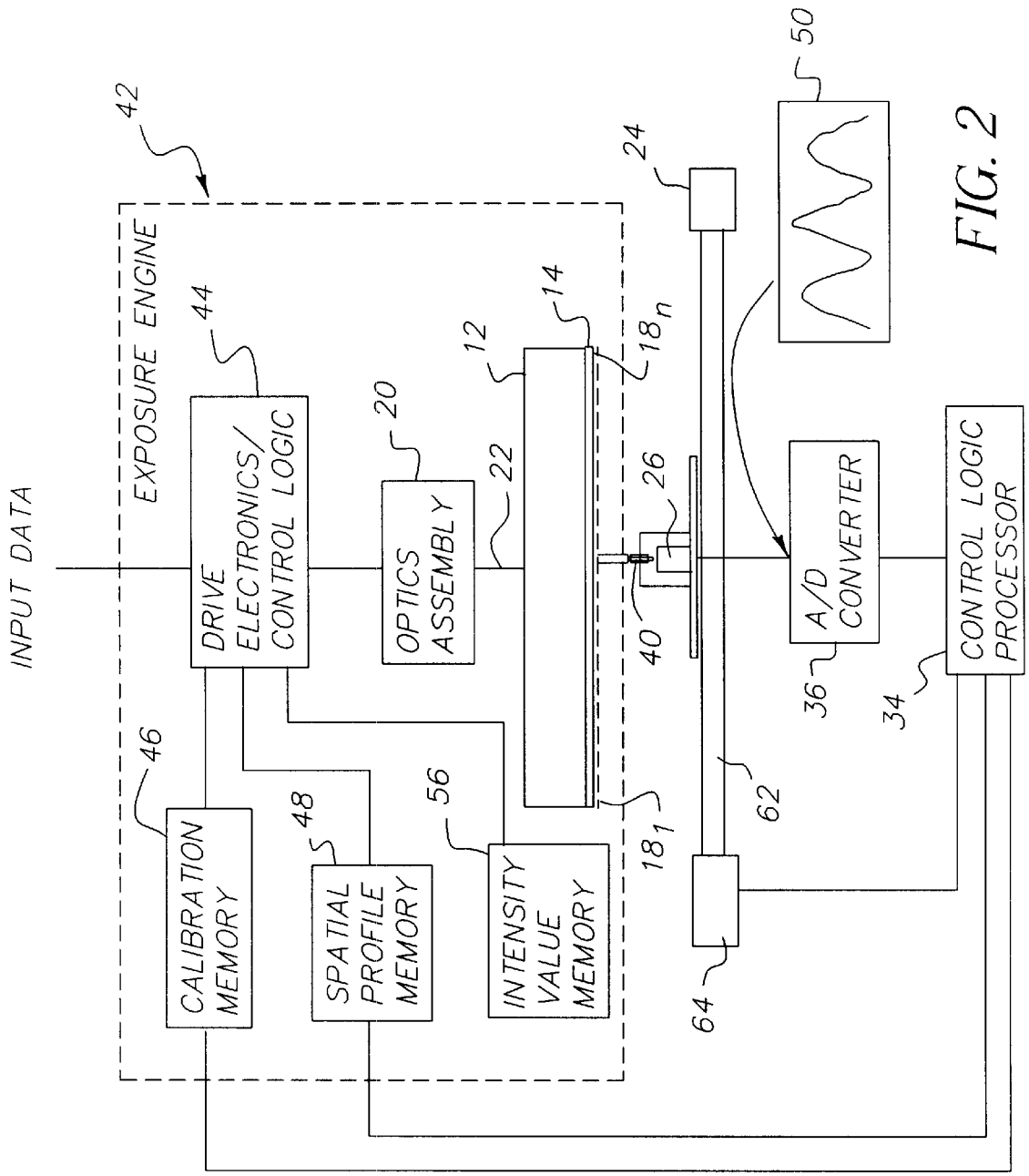
FIG. 2 is a schematic block diagram of the functional logic used to obtain spatial profile data using the apparatus of FIG. 1.

FIG. 2, illustrates the components of apparatus 10 that are used for obtaining output power measurements and for obtaining and storing a spatial profile for elements of printhead 12. Exposure engine 42 comprises printhead 12, optics assembly 20, drive electronics and control logic assembly 44, calibration memory 46 that contains updated output power values $P_i$ obtained during calibration and made available to drive electronics and control logic assembly 44, spatial profile memory 48 that contains computed beam diameter values $D_i$ provided by control logic processor 34 (using a computation method described below) and made available to drive electronics and control logic assembly 44, and intensity value memory 56 used to store exposure intensity values $I_i$, which are also computed using a method described below.

For obtaining output power measurements $P_i$ for each exposure element $18_1$, $18_2$, ... $18_n$, sensor 26 is moved into position in opposition to a desired one of exposure elements $18_1$, $18_2$, ... $18_n$. The specific exposure element $18_i$ is then activated at full output power. A/D converter 36 converts the signal from sensor 26 and provides the converted digital value to control logic processor 34. Control logic processor 34 processes and stores this $P_i$ value in calibration memory 46. Aperture 40 is provided to direct exposure energy onto sensor 26. For obtaining output power measurements $P_i$ aperture 40 is sized to allow the full beam area of exposure element $18_i$ (that is, one full pixel in exposure area) fall incident on sensor 26.

For obtaining spatial profile values that are used to compute a beam diameter $D_i$, aperture 40 is scaled such that sensor 26 can detect exposure light energy over only a fraction of the exposure area of the selected element $18_1$, $18_2$, ... $18_n$ (1/20 of a pixel in the preferred embodiment). With this arrangement, positioning assembly 24 can position sensor 26 at twenty incremental positions along the selected one of exposure elements $18_1$, $18_2$, ... $18_n$. This allows sensor 26 to obtain a spatial profile curve 50 for each exposure element $18_1$, $18_2$, ... $18_n$ from the sequence of measurements obtained by sensor 26.

Figure 3:
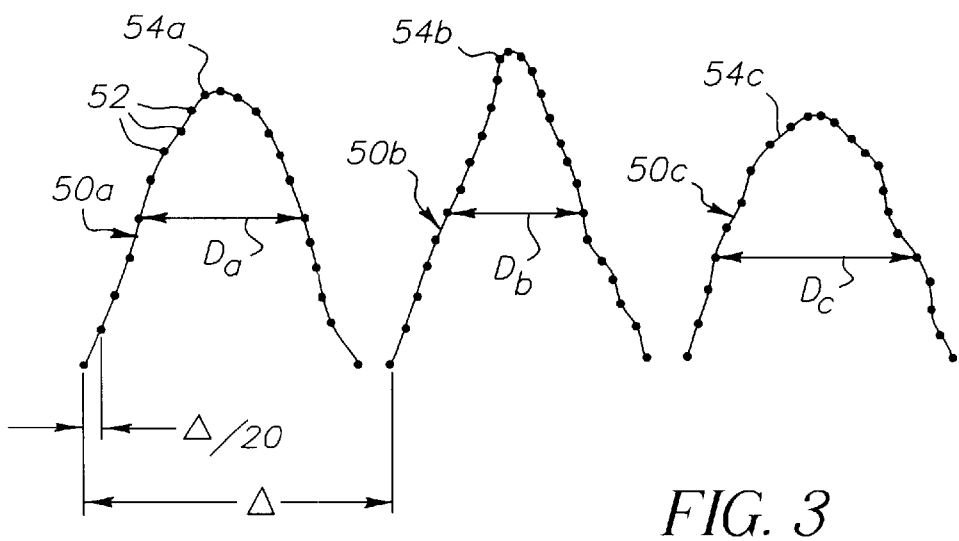
FIG. 3 is a graph of spatial profile measurements of exposure elements.

FIG. 3 illustrates three representative spatial profile curves 50a, 50b, and 50c corresponding to three different elements among elements $18_1$, $18_2$, ... $18_n$. In this example, each spatial profile curve 50a, 50b, and 50c shows a sequence of measured values 52 obtained for each of three corresponding exposure elements. The horizontal axis represents distance between measurements 52, obtained at intervals of 1/20 of a pixel (which corresponds to 1/20 of an exposure element). In FIG. 3, value □ indicates a distance between pixels (which generally corresponds to the distance between exposure elements). The distance between measurements 52 for generating spatial profile curves 50a, 50b, and 50c is then represented as □/20. Each spatial profile curve 50a, 50b, and 50c has a corresponding peak power measurement 54a, 54b, and 54c. Spatial profile curves 50a, 50b, and 50c can vary from each other in overall shape (as is suggested in FIG. 3) but are equally spaced distance □ apart.

As noted earlier, the basic apparatus of FIGS. 1 and 2 can also be used to obtain output power measurements $P_i$. To measure output power, however, aperture 40 is changed for a wider opening (typically at or near the □ value) to measure output power of a total element. The output power measurement $P_i$ for each of exposure elements $18_1, 18_2, \ldots 18_n$ is then taken with positioning assembly 24 moving sensor 26 in increments of distance □ at a time. Referring to the example of FIG. 3, it is possible that the output power measurement $P_a$, $P_b$ and $P_c$ for three corresponding exposure elements (based on taking a single measurement for each exposure element with aperture 40 near the □ value) might be substantially equal. However, the intensity values $I_a$, $I_b$, and $I_c$ of the exposure energy that is delivered from the exposure elements (based on multiple measurements 52 for each exposure element with aperture 40 near the □ □ value) would likely be different. As shown in FIG. 3, peak power measurements 54a, 54b, and 54c and the overall shapes of spatial profile curves 50a, 50b, and 50c, can differ between exposure elements. Using a method described below, the sequence of measurements 52 are used to compute a beam spot diameter $D_i$, or other beam spot characteristic, which is then used, together with the output power measurement $P_i$, to compute the effective intensity $I_i$ of the exposure energy for an individual exposure element.

Figure 4A:
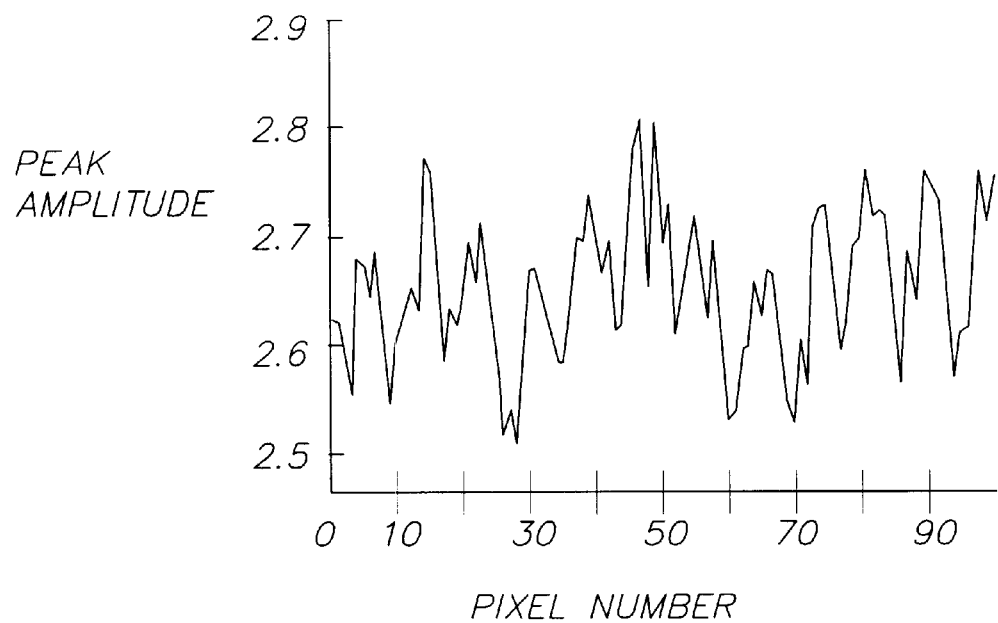
FIG. 4a is a graph showing a representative sampling of peak power values for a number of individual exposure elements.

FIG. 4a illustrates, from sampled data, a graphical representation of typical variations in output power measurements $P_i$ for exposure elements $18_i$ over a small portion (100 sampled exposure elements) of printhead 12. As was noted above, such output power measurements $P_i$ can be obtained periodically over the life of printhead 12, such as during routine calibration.

Figure 4B:
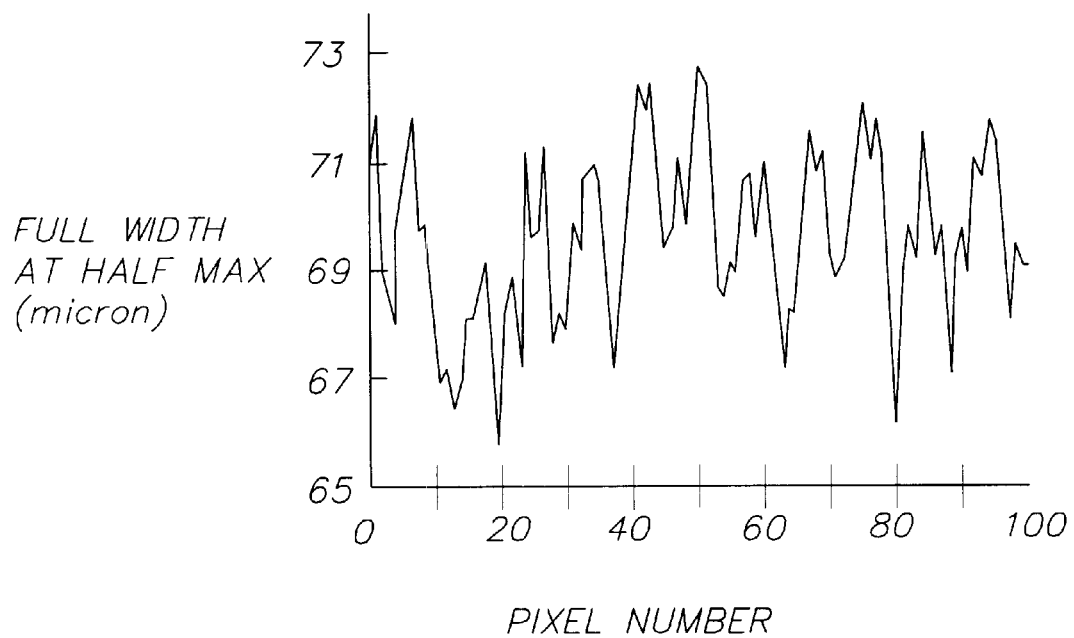
FIG. 4b is a graph showing a representative sampling of approximate spot diameters for a number of individual exposure elements.

FIG. 4b illustrates, from sampled data, a graphical representation of variability in the overall shapes of spatial characteristic curves 50 for exposure elements $18_i$, over the corresponding small portion (the same 100 pixels in FIG. 4a) of printhead 12. As an indicator of the shape of the spatial curves, a full width at half maximum value, or beam diameter $D_i$, is computed as the distance from one side of spatial curve to the other, at substantially half of the value of peak power measurement. Referring back to FIG. 3 as an example, it is shown that full width at half maximum value $D_i$ can differ between spatial characteristic curves 50.

Figure 5:
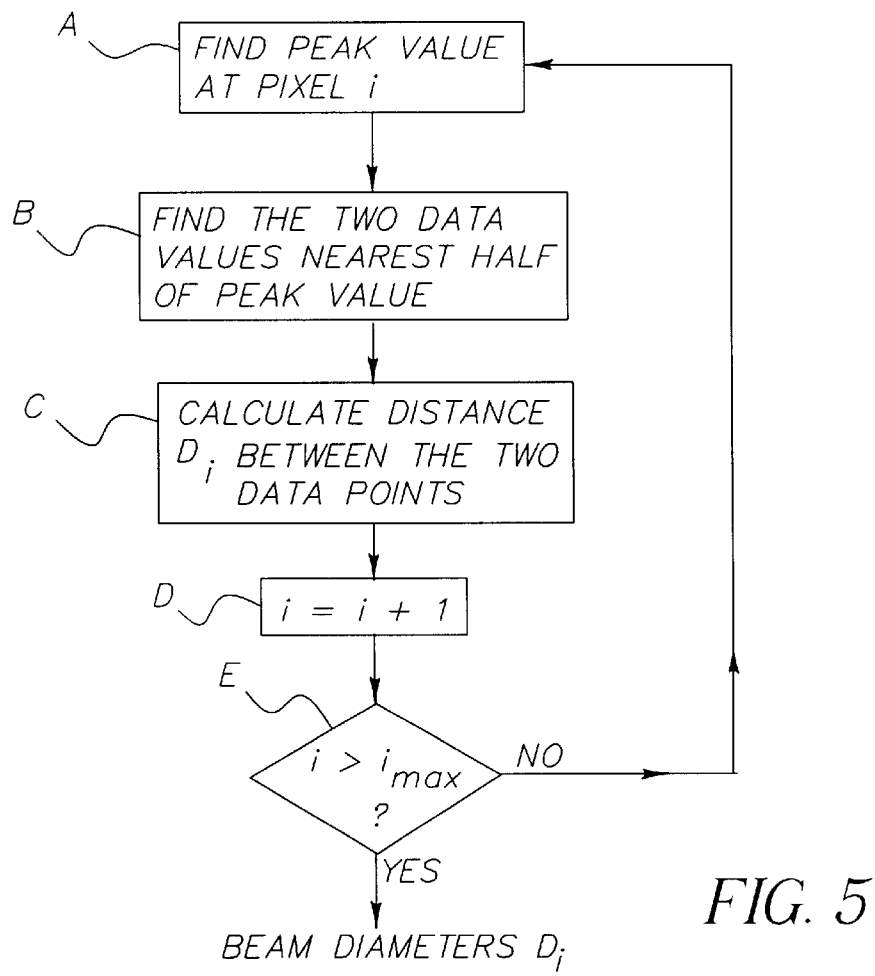
FIG. 5 is a flow chart showing the steps for determining the approximate spot diameter for each individual exposure element.

FIG. 5 illustrates the functional steps of a method for determining each beam diameter value $D_i$ from a sequence of measurements 52 of a spatial curve 50 in accordance with the preferred embodiment. In Step A, a peak power value 54 is identified based on the measurements disclosed above for a specific exposure element 18i (and thus the corresponding pixel i). In Step B, the two data values nearest half of peak power measurement value 54 are determined (one from ascending values in the sequence of measurements 52, one from the descending values). In Step C, the distance along the x axis of FIG. 3 between these two data values, i.e. the distance across the corresponding exposure element at which the half peak values of power occur, is calculated. The full width at half maximum value determined in Step C provides a relative beam diameter $D_i$ for the corresponding exposure element $18_i$. As noted above, each beam diameter $D_i$ can be stored in spatial profile memory 48. In Step D, the process moves on to the next exposure element by incrementing i and, in Step E, it is determined whether all of the data for desired exposure elements $18_i$ has been processed. If not, the process is repeated, by returning to Step A, as many times as needed to obtain a beam diameter value $D_i$ for each desired exposure element $18_i$. Beam diameter $D_i$ can be determined in any manner and can be based on any value of power. Alternatively another spatial characteristic can be determined.

It should be emphasized that the same basic components shown in FIGS. 1 and 2 can serve to determine both spatial profile measurements to obtain beam diameter $D_i$ (which can be performed one or more times and which requires relatively requires high resolution) and for output power measurement to obtain $P_i$ (which can be performed periodically with lower measurement resolution). However, because much lower resolution accuracy is required for periodic $P_i$ measurement for a manufactured printing apparatus 10, it may be advantageous to provide a separate fixture exclusively for spatial profile measurement, where such a special fixture is used only at a manufacture facility. Once spatial profile memory 48 is loaded with appropriate beam diameter $D_i$ values, using the procedure described in FIG. 5, exposure engine 42 can be removed from the fixture and installed within printing apparatus 10 for shipment to a customer.

Figure 6:
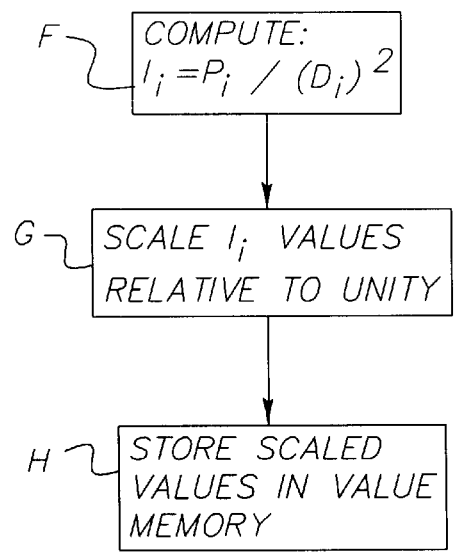
FIG. 6 is a flowchart showing the steps for determining intensity values.

FIG. 6 illustrates functional steps for populating intensity value memory 56 with exposure intensity $I_i$ values. The steps can be performed by drive electronics and control logic assembly 44. In Step F, a relative intensity value for each exposure element is computed based on using the following relationship:

$$I_i = P_i / (D_i)^2$$

In Step G, each relative intensity value computed in step F is divided by the maximum value computed in step F to scale all values $I_i$ relative to unity. The scaled intensity values $I_i$ computed in this manner are then stored in intensity value memory 56 in Step H. These $I_i$ values serve as uniformity correction data for modifying the drive signals of (or otherwise controlling) exposure elements 18 in printhead 12. Since intensity, and not just overall power, of exposure elements 18 is considered, control of the exposure elements 18 can be effected to compensate for variations in exposure elements 18 and thus eliminate non-uniformity to a very high degree.

It can be seen that the method disclosed above provides non-uniformity correction wherein exposure intensity is a factor. Whereas conventional printheads and correction methods attempt to adjust non-uniformity using only peak power measurements (such as those measurements shown in the example of FIG. 4a), such conventional methods cannot provide a high degree of correction. The preferred embodiment disclosed above can achieve improved results by accounting for the spatial profile of the exposure energy. To accomplish this, the preferred embodiment uses of a high-resolution scanning sensor having an aperture adapted to obtain a spatial profile of exposure energy for each exposure element by sensing energy from various portions of the exposure element.

The preferred embodiment allows static data to be obtained upon printhead manufacture, where this data does not change measurably over the life of the printhead, and couples this data to the printhead so that it can be accessed by a print apparatus that uses the printhead. Characteristics of the printhead that generally do not change with time can be permanently stored in a fixed memory, accessible for reference by printer logic circuitry. Attention and analysis for printhead power calibration and non-uniformity adjustment can be focused on exposure aspects that are known to change over time.

The preferred embodiment also minimizes the need to correct for photosensitive media response and development chemistry when compensating for printhead non-uniformity and reduces dependence on a print scanner, which would otherwise add cost and complexity to methods for non-uniformity correction. Output power can be measured directly and combined with stored data relating to the spatial profile to obtain the needed compensation variables.

The invention can be applied to a single-color printer or for a printer that uses either additive color (red, green, blue)

or subtractive color (cyan, magenta, yellow, and optionally black) with any number of channels. The invention can be applied to a printhead that emits exposure energy at any suitable wavelength. The invention may include multiple printheads, such as for different color separations. Non-uniformity correction could then be applied to each printhead as needed.

The invention can be applied to exposure elements of any type, using light sources 58 such as lasers, LEDs, for example, as shown in FIG. 1. Alternately, exposure elements can emit energy in the from of heat, as in a thermal printer, or any other form of energy. Of course, the sensor can be configured to measure the power of the type of energy being emitted. The arrangement of memory and control logic components can be modified to achieve the desired functional logic. Any type of memory devices can be used to store the data. Any appropriate translation assembly can be used. For example, with reference to FIG. 2, an arrangement comprising a leadscrew 62 could be used or a positioning assembly 24 could comprise a piezoelectric actuator 64 to move sensor 26. Alternatively, the sensor can be moved angularly or in any other manner to measure energy at the appropriate position. In fact, the translation assembly need not move the sensor at all. For example, a mask, lens, mirror, or aperture can be moved or adjusted accordingly, to permit the translation assembly to direct energy from the proper area to the sensor, i.e. configure the sensor, while the sensor remains in lace.

The invention has been described in detail with particular reference to certain preferred embodiments thereof, but it will be understood that variations and modifications can be effected within the scope of the invention.

PARTS LIST

10. Printing apparatus
12. Printhead
14. Lens array
16. Receiver medium
18. Exposure element
20. Optics assembly
22. Fiber optic cables
24. Positioning assembly
26. Sensor
34. Control logic processor
36. A/D converter
40. Aperture
42. Exposure engine
44. Drive electronics and control logic assembly
46. Calibration memory
48. Spatial profile memory
50. Spatial profile curve
52. Measurement
54. Peak power measurement
56. Intensity value memory
58. Light source
60. Light valve
62. Leadscrew
64. Piezoelectric actuator

What is claimed is:

1. A printhead assembly for imaging onto a medium, the printhead assembly comprising:

a printhead having a plurality of exposure elements, each exposure element emitting exposure energy over an exposure area;

a memory coupled to the printhead and containing a compensation value for each of at least some of said exposure elements, said compensation values being determined by obtaining a plurality of positional output power measurements corresponding to a set of predefined spaced-apart positions within said exposure area to determine a spatial characteristic of exposure energy emitted by the corresponding exposure element;

wherein the spatial characteristic is a beam spot diameter of the energy calculated by determining a maximum of the positional output power measurement for a corresponding exposure element and calculating a distance between two of the predefined spaced-apart positions at which positional output power measurements have approximately a predefined relationship to the maximum of the positional output power measurement for the exposure element; and wherein said predefined relationship is where positional output power measurements are approximately one half of the maximum of the positional output power measurement for the exposure element.

2. The printhead assembly of claim 1 wherein said exposure elements apply light energy to the medium.

3. The printhead assembly of claim 1 wherein said exposure elements comprise light valves.

4. The printhead assembly of claim 1 wherein said exposure elements comprise a laser.

5. The printhead assembly of claim 1 wherein said exposure elements comprise an LED.

6. An apparatus for obtaining a spatial profile of exposure output power from an exposure element in a printhead comprising a plurality of exposure elements, the apparatus comprising:

a sensor configured to obtain a positional output power measurement for said exposure elements corresponding to a portion of the exposure output power of the corresponding exposure element emitted at each one of a plurality of predefined positions;

a translation apparatus for moving said sensor to each one of said plurality of predefined positions for said exposure element to thereby permit said sensor to obtain a sequence of said positional output power measurements for a corresponding one of said exposure elements;

control logic programmed to accept said sequence of positional output power measurements from said sensor and to generate, for said exposure element, spatial profile characteristic information using said sequence of positional output power measurements;

a memory operatively coupled to said control logic and storing the spatial profile characteristic information for said exposure elements; and wherein said memory is a read-only memory device.

7. The apparatus of claim 6 wherein said translation apparatus comprises means for moving said sensor.

8. The apparatus of claim 7 wherein said means for moving comprises a piezoelectric actuator.

9. The apparatus of claim 7 wherein said means for moving comprises a leadscrew.

10. A method for compensating for non-uniformity of exposure elements in a printhead comprising a plurality of exposure elements, wherein each said exposure element emits exposure energy over an exposure area, the method comprising:

obtaining a sequence of output power measurements for said each of exposure elements, each said output power measurement in said sequence corresponding to a predetermined position within said exposure area;

deriving a correction value based on said sequence of output power measurements;

storing the correction value for each of said exposure elements;

applying the correction values to control of said exposure elements;

wherein said deriving step comprises determining a spot size value for said exposure element; and wherein said determining step comprises determining a maximum of the positional output power measurement for a corresponding exposure element and calculating a distance between two of the predefined spaced-apart positions at which positional output power measurements have approximately a predefined relationship to the maximum of the positional output power measurement for the exposure element.

11. The method of claim 10 wherein said predefined relationship is where positional output power measurements are approximately one half of the maximum of the positional output power measurement for the exposure element.

12. The method of claim 10, wherein the step of deriving a correction value comprises:

measuring overall output power emitted by said exposure element; and deriving a beam spot characteristic value.

13. The method of claim 12 wherein the step of measuring overall output power comprises the step of providing a sensor capable of obtaining a power measurement.

14. The method of claim 12 wherein the step of calculating a beam spot characteristic value comprises:

identifying a maximum output power measurement in said sequence of output power measurements;

dividing said maximum output power measurement by two to obtain a half maximum output power measurement value;

identifying, from said sequence of output power measurements, a rising-edge full-width reference value as the output power measurement, in that portion of said sequence of output power measurements that precedes said maximum output power measurement, nearest to said half maximum output power measurement value, and identifying a first full-width position as said predetermined position within said predefined pixel area that corresponds with said rising-edge full-width reference value;

identifying, from said sequence of output power measurements, a falling-edge full-width reference value as the output power measurement, in that portion of said sequence of output power measurements that follows said maximum output power measurement, nearest to said half maximum output power measurement value, and identifying a second full-width position as said predetermined position within said predefined pixel area that corresponds with said falling-edge full-width reference value; and computing a linear distance between said second full-width position and said first full-width position.

15. The method of claim 10 wherein said step of obtaining a sequence of output power measurements comprises adapting a sensor to receive output power emitted over a predefined fraction of said exposure area, establishing a reference position for said sensor, and performing an ordered repetition of the following steps:

moving said sensor to a sensing position, said sensing position being a fixed incremental distance from said reference position, said fixed incremental distance being a fraction of the distance across said exposure area;

obtaining one of said output power measurements from said sensor at said sensing position;

storing said output power measurement within said sequence of output power measurements; and establishing said sensing position as said reference position.

16. A printhead assembly for imaging onto a medium, the printhead assembly comprising:

a printhead having a plurality of exposure elements, each exposure element emitting exposure energy over an exposure area;

a memory coupled to the printhead and containing a compensation value for each of at least some of said exposure elements, said compensation values being determined by obtaining a plurality of positional output power measurements corresponding to a set of predefined spaced-apart positions within said exposure area to determine a spatial characteristic of exposure energy emitted by the corresponding exposure element;

wherein the spatial characteristic is a beam spot diameter of the energy calculated by determining a maximum of the positional output power measurement for a corresponding exposure element and calculating a distance between two of the predefined spaced-apart positions at which positional output power measurements have approximately a predefined relationship to the maximum of the positional output power measurement for the exposure element; and wherein said predefined relationship is where positional output power measurements are approximately one half of the maximum of the positional output power measurement for the exposure element.

17. A method for compensating for non-uniformity of exposure elements in a printhead comprising a plurality of exposure elements, wherein each said exposure element emits exposure energy over an exposure area, the method comprising:

obtaining a sequence of output power measurements for said each of exposure elements, each said output power measurement in said sequence corresponding to a predetermined position within said exposure area;

deriving a correction value based on said sequence of output power measurements;

storing the correction value for each of said exposure elements;

applying the correction values to control of said exposure elements;

wherein said deriving step comprises determining a spot size value for said exposure element; and wherein said determining step comprises determining a maximum of the positional output power measurement for a corresponding exposure element and calculating a distance between two of the predefined spaced-apart positions at which positional output power measurements have approximately a predefined relationship to the maximum of the positional output power measurement for the exposure element.

18. A method for compensating for non-uniformity of exposure elements in a printhead comprising a plurality of exposure elements, wherein each said exposure element emits exposure energy over an exposure area, the method comprising:

obtaining a sequence of output power measurements for said each of exposure elements, each said output power measurement in said sequence corresponding to a predetermined position within said exposure area;

deriving a correction value based on said sequence of output power measurements;

storing the correction value for each of said exposure elements;

applying the correction values to control of said exposure elements;

identifying a maximum output power measurement in said sequence of output power measurements;

dividing said maximum output power measurement by two to obtain a half maximum output power measurement value;

identifying, from said sequence of output power measurements, a rising-edge full-width reference value as the output power measurement, in that portion of said sequence of output power measurements that precedes said maximum output power measurement, nearest to said half maximum output power measurement value, and identifying a first full-width position as said predetermined position within said predefined pixel area that corresponds with said rising-edge full-width reference value;

identifying, from said sequence of output power measurements, a falling-edge full-width reference value as the output power measurement, in that portion of said sequence of output power measurements that follows said maximum output power measurement, nearest to said half maximum output power measurement value, and identifying a second full-width position as said predetermined position within said predefined pixel area that corresponds with said falling-edge full-width reference value; and computing a linear distance between said second full-width position and said first full-width position.

* * * * *